(12) United States Patent
Leedy

(10) Patent No.: US 8,590,935 B1
(45) Date of Patent: Nov. 26, 2013

(54) AUTOMATIC RESTRAINT BELT RELEASE SYSTEM

(71) Applicant: Wesley T. Leedy, Reno, NV (US)

(72) Inventor: Wesley T. Leedy, Reno, NV (US)

(*) Notice: Subject to any disclaimer, the term of this patent is extended or adjusted under 35 U.S.C. 154(b) by 0 days.

(21) Appl. No.: 13/708,156

(22) Filed: Dec. 7, 2012

Related U.S. Application Data

(60) Provisional application No. 61/567,905, filed on Dec. 7, 2011.

(51) Int. Cl.
B60R 22/00 (2006.01)

(52) U.S. Cl.
USPC .............................. 280/808; 180/270; 297/468

(58) Field of Classification Search
USPC ........... 280/807, 808; 180/270, 271; 297/468, 297/475, 483, 801.1, 807, 808
See application file for complete search history.

(56) References Cited

U.S. PATENT DOCUMENTS

| | | | |
|---|---|---|---|
| 3,840,249 A | 10/1974 | Strom | |
| 3,963,090 A | 6/1976 | Hollins | |
| 4,162,715 A | 7/1979 | Coulombe | |
| 4,432,119 A | 2/1984 | Schwark et al. | |
| 4,553,625 A | 11/1985 | Tsuge et al. | |
| 5,121,527 A | 6/1992 | Righi | |
| 5,520,263 A | 5/1996 | Suran et al. | |
| 6,123,166 A * | 9/2000 | Verellen | 180/268 |
| 6,921,136 B2 * | 7/2005 | Bell et al. | 297/468 |
| 7,178,208 B2 | 2/2007 | Bentsen et al. | |
| 7,275,613 B2 | 10/2007 | Park | |

* cited by examiner

Primary Examiner — Faye M. Fleming
(74) Attorney, Agent, or Firm — Montgomery Patent & Design; Robert C. Montgomery (57) ABSTRACT

An automatic seatbelt release system includes an electrically-released buckle which engages a shoulder belt and a lap belt. When engaged, the system provides the protection and functionality of a common three-point seatbelt. When a user opens a vehicle door, an electric switch within the door handle provides a signal to disengage the buckle causing both the shoulder and lap belts to retract, enabling the user to exit the vehicle in an expedient manner. The system is particularly useful for law enforcement officers or military personnel who need to frequently and quickly exit a vehicle. A power switch is provided to deactivate the system.

20 Claims, 4 Drawing Sheets

AUTOMATIC RESTRAINT BELT RELEASE SYSTEM

RELATED APPLICATIONS

The present invention was first described in U.S. Provisional Patent Application No. 61/567,905 filed on Dec. 7, 2011, the contents of which are incorporated herein by reference.

FIELD OF THE INVENTION

The present invention relates generally to a vehicle restraint belt and, more particularly, to a restraint belt system which can be selectively operated manually or automatically.

BACKGROUND OF THE INVENTION

Seatbelts are a ubiquitous feature in vehicles of all types, and in particular are installed in all modern automobiles. Seatbelts are such an important safety feature that in many locations their use is mandated by law.

Due to educational awareness programs and state laws, most people today automatically buckle up their seatbelt upon entering a motor vehicle. Such use has undoubtedly saved countless lives and will continue to do so into the future. However, a portion of the population sometimes seen not wearing seatbelts are those of law enforcement officers and military personnel who frequently need to exit a motor vehicle in an emergency situation. The extra seconds taken to release a seatbelt system are often seen as a detriment to their safety. Accordingly, there exists a need for a means by which seatbelt systems can be automatically and quickly released in a simultaneous manner as the vehicle door being opened to address the situation described above.

Having recognized the abovementioned problems, the inventor observed there remains a need for a means by which seatbelt systems can be quickly released in an automatic manner to address the situation described above.

Several attempts have been made in the past to provide such an automatic belt restraint release device. U.S. Pat. No. 3,840,249, in the name of Strom, discloses an assembly for positioning safety belts in restraining and non-restraining positions with pivoting arm mounted along the floor of the vehicle in response to opening and closing of the door. The Strom invention utilizes mechanical coupling between the door and the release mechanism whereas the present invention relies upon electrical signals.

U.S. Pat. No. 3,963,090, issued in the name of Hollins, describes an automatic seat belt buckle unlatching mechanism for when the engine of the vehicle is stalled. Unfortunately, this does not fall under the overall scope of the present invention.

U.S. Pat. No. 4,553,625, issued in the name of Tsuge et al., U.S. Pat. No. 4,432,119 issued in the name of Schwark et al., and U.S. Pat. No. 7,275,613, issued in the name of Park, each disclose similar automatic seat belt unbuckling mechanisms.

None of the prior art particularly describes a device that provides such a release mechanism for a shoulder belt assembly and lap belt assembly restraint in a vehicle. Accordingly, there is a need for a means by which one can quickly remove such belt restraint assemblies during an emergency or need for quick exit of a vehicle, such as emergency or law enforcement personnel.

SUMMARY OF THE INVENTION

In view of the foregoing disadvantages inherent in the prior art, it has been observed that there is need of a means provide a selectively manual or automatic release of a belt assembly in a motor vehicle.

An object of the present invention is to provide an automatic restraint belt release system comprising a buckle assembly, a shoulder belt assembly comprising a shoulder belt and a shoulder recoil unit, a lap belt assembly comprising a lap belt and a lap recoil unit, a latch switch mounted within a door of the vehicle, and a power switch mounted within the door.

A further object of the present invention is to provide such a belt buckle assembly comprising a control module configured to be affixed to a floor of a vehicle, a bracket hingedly attached to the control module, a belt buckle affixed to the bracket, and a release mechanism integral with the belt buckle and in electrical communication with the control module. The power switch activates the control module. The latch switch, which is connected to the existing door opening switch, automatically activates the control module to actuate the release mechanism.

Another object of the present invention is to provide such a control module having an enclosure rigidly mounted to the floor housing a control means for operating the releasing mechanism. The control means is in electrical communication with both the latch switch and the power switch.

Yet another object of the present invention provides for the shoulder recoil unit to be mounted to the door frame and the lap recoil unit to be mounted to the floor of the vehicle.

Yet another object of the present invention provides for the shoulder belt assembly to further comprise a length of shoulder belting affixed to the shoulder recoil unit, a shoulder clasp affixed to the shoulder belting, a shoulder belt bracket with a shoulder roller unit integral thereto, a shoulder mounting bracket attached to the vehicle and attached to the shoulder belt bracket via a shoulder spring hinge, and a shoulder stop bar slidably attached to the shoulder belting.

Yet another object of the present invention provides for the lap belt assembly to further comprise a length of lap belting affixed to the lap recoil unit, a lap clasp affixed to the lap belting, a lap belt bracket with a lap roller unit integral thereto, a lap mounting bracket attached to the vehicle and attached to the lap belt bracket via a lap spring hinge, and a lap stop bar slidably attached to the lap belting.

Yet another object of the present invention provides for the belt brackets of the shoulder belt assembly and said lap belt assembly to be each attached to the door frame of the vehicle.

Yet another object of the present invention provides the release mechanism to further comprise a release button supported by a first spring within the belt buckle and extending outward therefrom, a release solenoid in electrical communication with the control means, a belt latch operably coupled to the release solenoid via connecting linkage and supported by a second spring, and a linkage support mounted within the belt buckle such that the connecting linkage is pivotally connected thereto. The release button manually releases the belt latch from the shoulder clasp and lap clasp Still yet another object of the present invention is to provide an alignment tab on the shoulder clasp to removably connect to an alignment slot of the lap clasp to enable simultaneous insertion of the shoulder clasp and lap clasp within the belt buckle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 automatic restraint belt release system
20 belt release mechanism
22 linear buckle
24a release solenoid
24b solenoid shaft
25 release plate
26 belt release bracket
27 spring hinge
28 control module housing
30 door latch switch
32 power switch
36 wiring
40 belt latch
41 linkage support
42 solenoid linkage
43 first spring
44 second spring
50 shoulder belt assembly
52 shoulder belting
53a alignment slot
53b alignment tab
54a shoulder belt clasp
54b lap belt clasp
55a shoulder clasp aperture
55b lap clasp aperture
56 stop bar
58a shoulder belt bracket
58b lap belt bracket
59 roller unit
60 first recoil unit
62 roller
66 mounting bracket
80 lap belt assembly
82 lap belting
86 second recoil unit
100 vehicle seat
105 vehicle
107 door frame
108 floor
110 door latch
115 fastener

DETAILED DESCRIPTION OF THE PREFERRED EMBODIMENT

The best mode for carrying out the invention is presented in terms of its preferred embodiment, herein depicted within FIG. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
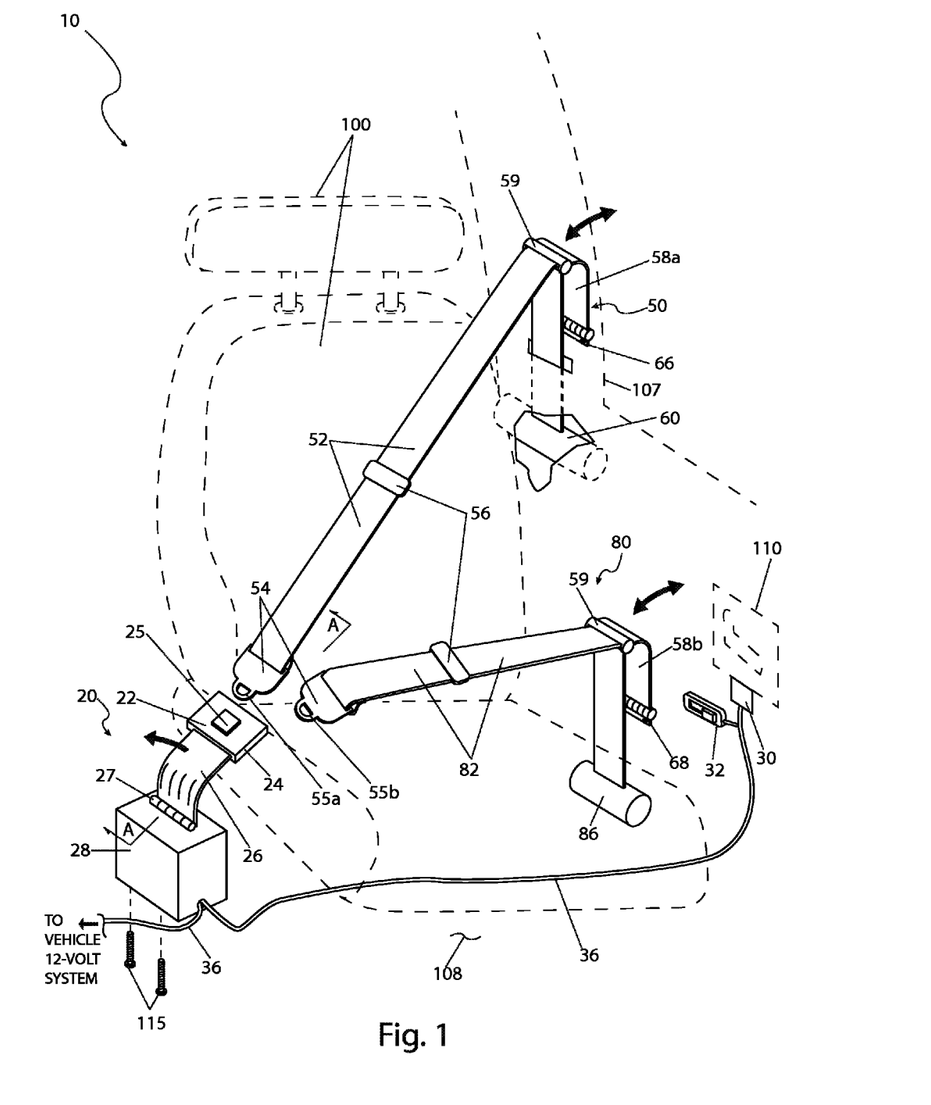
FIG. 1 is an environmental view of an automatic restraint belt release system 10 depicting an in-use state, according to a preferred embodiment of the present invention.

Referring now to FIG. 1, an environmental view of the automatic restraint belt release system (herein described as the "system") 10, which provides automatic release of restraining belt portions and enables quick exiting from a vehicle 105, being particularly useful for use by law enforcement and military personnel. The system 10 comprises an electrically released linear buckle 22 which provides a three-point restraint mechanism, coincidentally anchoring both a shoulder belt assembly 50 and a lap belt assembly 80 via respective clasp portions 54a, 54b. The linear buckle 22 is in mechanical communication with a chassis portion of the vehicle 105 via an anchoring structure comprising an arcuate belt release bracket 26 and a control module housing 28 being affixed to a center floor area 108 of the vehicle 105. The belt release bracket 26 and the control module housing 28 are joined to form a structure being capable of withstanding tensile forces associated with conventional seat belt systems. The control module housing 28 comprises a heavy-duty metal enclosure being rigidly mounted to said floor portion 108 using a plurality of anchoring fasteners 115. The control module housing 28 provides mounted containment and protection of electrical and electronic controlling portions of the system 10 (see FIG. 4). The control module housing 28 provides a pivoting attachment means to the belt release bracket 26 via a spring hinge 27. The belt release bracket 26 in turn is integrally joined to the linear buckle 22. The outwardly biased spring hinge 27 causes the linear buckle 22 to pivot away from the user automatically upon detachment of the shoulder 50 and lap 80 belt assemblies, thereby providing unimpeded exit of the user from the vehicle 105.

The system 10 provides automatic detachment of the shoulder 50 and lap 80 belt assemblies via a door latch switch 30, a power switch 32, and interconnecting wiring 36. The door latch switch 30 is to be mounted and positioned within a door portion of the vehicle 105 and being in mechanical communication with a door latch mechanism portion 110 of said door so as to cause electrical actuation of the door latch switch 30 upon opening the door. The power switch 32 is envisioned to be conveniently located along an inner door panel portion, thereby allowing selective activation or deactivation of the system 10 by the user. Upon opening a door portion of the vehicle 105 while the system 10 is activated, the electrical door latch switch 30 conducts an electrical signal via the wiring 36 to the control module housing 28. The control module housing 28 in turn provides power to an integral release solenoid 24 within the linear buckle 22 to disengage the linear buckle 22, thereby automatically releasing the belt assemblies 50, 80 and allowing the user to freely and quickly exit the vehicle 105. When the system 10 is deactivated using the power switch 32, the first buckle 22 and belt assemblies 50, 80 are envisioned to operate manually, similar to a conventional seat belt system by pressing a release button portion 25 located along a top surface of the linear buckle 22.

The system 10 is preferably incorporated into the construction of new vehicles 105; however, it is understood that various models of the system 10 may be packaged as an aftermarket kit for installation within various vehicles 105 without deviating from the teaching of the system 10, and as such, should not be interpreted as a limiting factor of the system 10. It is further understood that the system 10 may be configured in a "mirror-image" manner for implementation on a right-side seat portion 100 within the vehicle 105 without being interpreted as a limiting factor of the system 10 as well.

Figure 2:
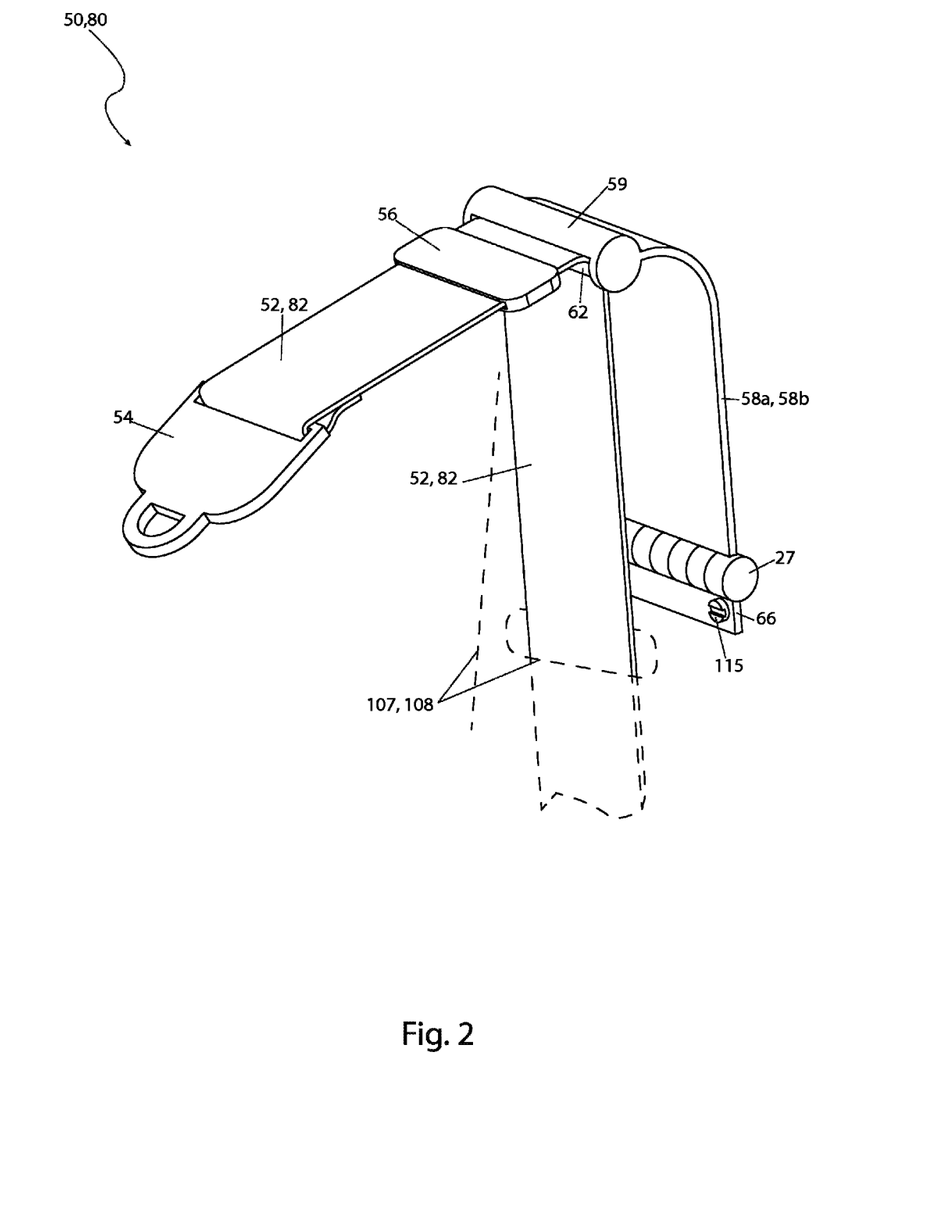
FIG. 2 is a close-up view of a shoulder belt assembly portion 50 of the automatic restraint belt release system 10, according to a preferred embodiment of the present invention.

Referring now to FIG. 2, a close-up view of shoulder and lap belt assembly portions 50, 80 of the system 10, according to a preferred embodiment of the present invention, is disclosed. The shoulder 50 and lap 80 belt assemblies each comprise a length of shoulder belting 52 and lap belting 82, respectively, being made using strong textile strapping material commonly associated with seat belt construction, being introduced in various vehicle interior-matching colors. Said belt assemblies 50, 80 further comprise respective clasps 54a, 54b at proximal ends being sewn or otherwise ruggedly joined to end portions of the belting 52, 82. A distal end portion of said shoulder belt 50 is attached to a door frame portion 107 of the vehicle 105 via a shoulder belt bracket 58a, spring hinge 27, and mounting bracket 66. Similarly, the lap belt 80 is attached to a door frame portion 107 of the vehicle 105 via a lap belt bracket 58b, thereby providing similar pivoting function as the aforementioned belt release bracket 26. Additionally, said shoulder 50 and lap 80 belt assemblies comprise respective first recoil 60 and second recoil 86 units being mounted to door frame 107 and floor 108 portions, respectively, in a conventional manner. Said recoil units 60, 86 are envisioned to be similar to conventional inertial-operating units found within many popular vehicles. Said recoil mechanisms 60, 86 are envisioned to work in conjunction with respective roller units 59 being integrated into upper edge portions of the aforementioned shoulder belt and lap belt brackets 58a, 58b. Each roller unit 59 comprises a cylindrical-shaped metal enclosure which axially supports an internal metal roller 62 to smoothly redirect the shoulder 52 and lap 82 belting portions downwardly into the recoil units 60, 86 during release and retraction of said belt assemblies 50, 80. Said belt assemblies 50, 80 are also envisioned to utilize common adjustable friction stop bars 56 which limit retraction of said belt assemblies 50, 80 when released.

Figure 3:
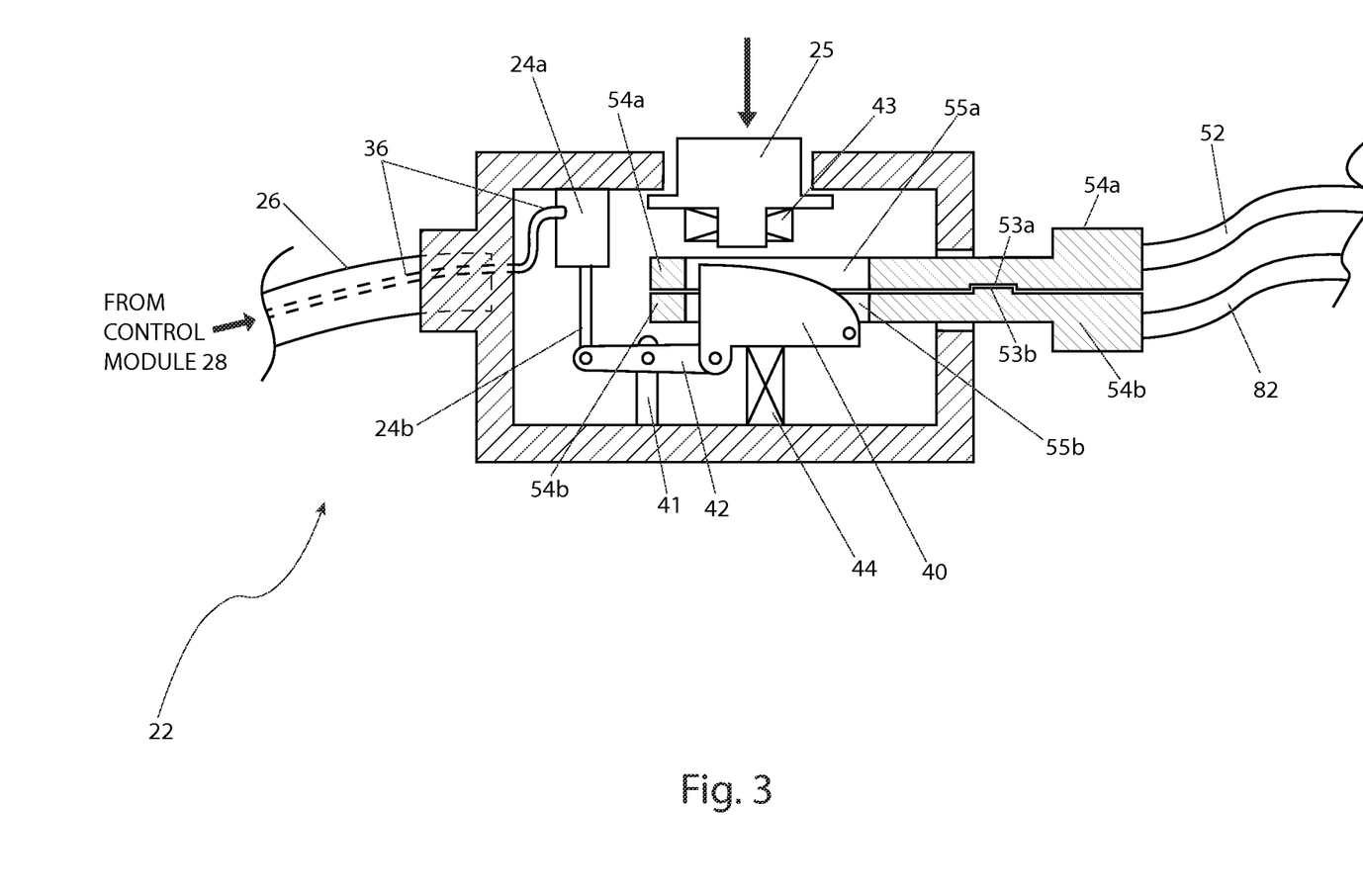
FIG. 3 is a section view of a linear buckle portion 22 of the automatic restraint belt release system 10 taken along section line A-A (see FIG. 1), according to a preferred embodiment of the present invention; and, FIG. 4 is an electrical block diagram of the automatic restraint belt release system 10, according to a preferred embodiment of the present invention.

Referring now to FIG. 3, a section view of the linear buckle portion 22 of the system 10 taken along section line A-A (see FIG. 1), according to a preferred embodiment of the present invention, is disclosed. The first clasp 54a comprises a recessed alignment slot 53a and the second clasp 54b comprises a matching and inserting alignment tab 53b. Said alignment slot 53a and alignment tab 53b act to interlock and align the clasps 54a, 54b prior to, and during insertion into the linear buckle 22. The linear buckle 22 comprises a manual release button portion 25 being supported by a first spring 43, which enables manual operation in a conventional manner. Additionally, the linear buckle 22 provides a means of electrical release via an internal release solenoid 24a which when electrically actuated by the control module 28, causes disengagement of an internal belt latch portion 40 to release the belt assemblies 50, 80. The solenoid 24a preferably comprises a linear electromagnetic unit having a reciprocating solenoid shaft portion 24b. The solenoid shaft 24b is in mechanical communication with the belt latch 40 via connecting linkage 42 which acts to motion said belt latch 40. The connecting linkage 42 is supported within the linear buckle 22 via a linkage support 41. The belt latch 40 is supported by a second spring 44, thereby being normally engaged within respective clasp aperture portions 55a, 55b of each clasp 54a, 54b to secure the belt assemblies 50, 80 within the linear buckle 22. Actuation of the solenoid 24a pivotingly motions the belt latch 40 via the connecting linkage 42 to release the belt assemblies 50, 80, allowing the user to freely and quickly exit the vehicle 105. When the system 10 is electrically deactivated using the power switch 32, the linear buckle 22 and belt assemblies 50, 80 are envisioned to operate in a conventional manual manner by pressing the release button 25.

Figure 4:
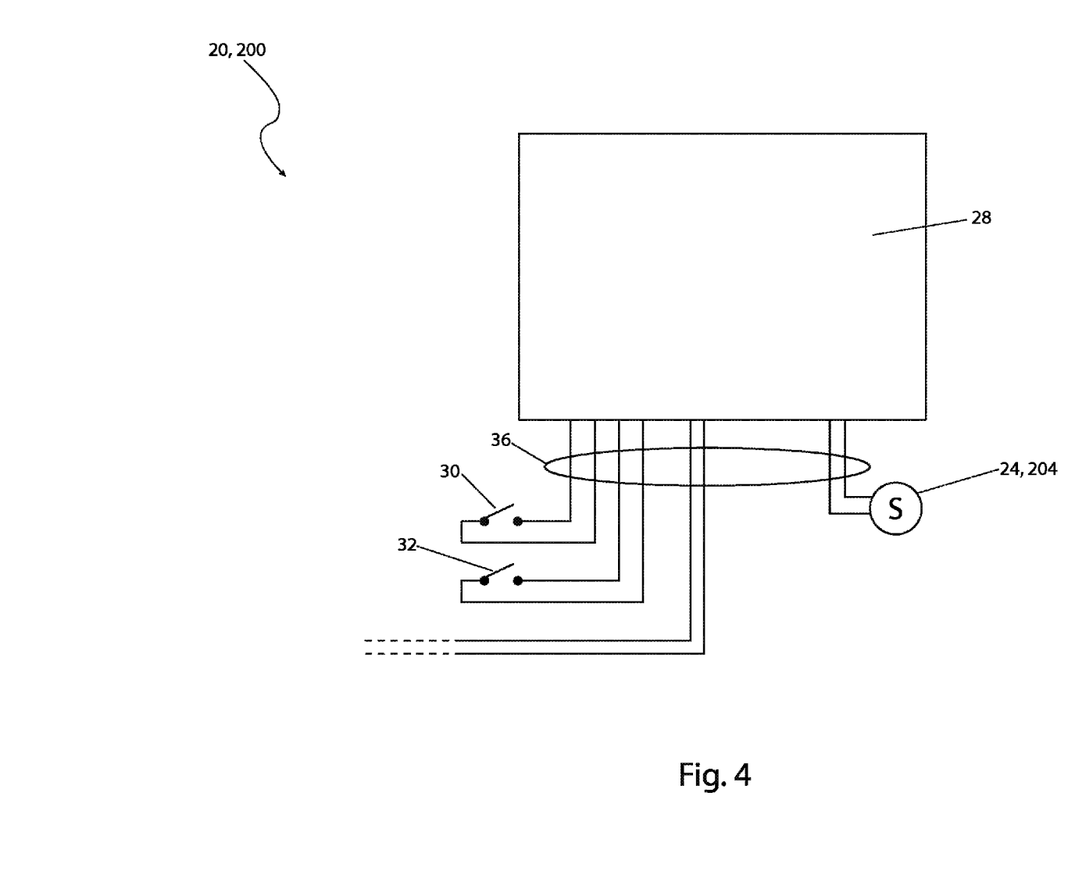

Referring now to FIG. 4, an electrical block diagram of the system 10, according to a preferred embodiment of the present invention, is disclosed. Electrical power to the system 10 is provided via connection of wiring 36 between the control module housing 28 to an un-switched circuit portion of the vehicle's 105 12-volt electrical system. The control module housing 28 contains electrical and electronic equipment such as, but not limited to: printed circuit boards, microprocessors, relays, embedded software, and the like, being necessary to the automatic operation of the system 10. Said control module housing 28 receives input signals from the door latch switch 30 and the power switch 32, and in turn provides power to the releasing solenoid 24a based upon software instructions, thereby releasing the belt assemblies 50, 80.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 1.

The method of installing the system 10 (when procured in a retrofit kit form), may be achieved by performing the following steps: removing original personal restraining equipment including the shoulder belt, seat belt, recoiling devices, and anchoring means from the vehicle 105; anchoring the control module housing 28 to a middle floor portion 108 of the vehicle 105 using the fasteners 115; anchoring the first 60 and second 86 recoil units to the existing original equipment mounting features at door frame 107 and floor 108 areas of the vehicle 105 using fasteners 115; mounting the door latch switch 30 so as to be in mechanical communication with the door latch mechanism 110; mounting the power switch 32 upon the inner door panel portion of the vehicle 105; routing and connecting wiring 36 discreetly between the door latch switch 30 and power switch 32 portions, and the control module housing 28; and, routing and connecting additional wiring 36 from the control module housing 28 to an existing un-switched 12-volt circuit within the vehicle 105. The system 10 is ready for operation.

The method of utilizing the system 10 may be achieved by performing the following steps: occupying a vehicle seat 100 within the vehicle 105; engaging alignment slot 53a and alignment tab 53b portions of the respective first 54a and second 54b clasps; inserting clasp portions 54a, 54b of the shoulder 50 and lap 80 belt assemblies into to the linear buckle 22; activating the system 10 by selecting the "ON" position upon the power switch 32; driving the vehicle 105 to a destination in a normal manner; utilizing the automatic release feature of the system 10 by grasping and motioning the door latch 110, activating a signal from the door latch switch 30 to the control module housing 28 causing actuation of the linear solenoid 22 and release of the belt assemblies 50, 80; exiting the vehicle 105 in an expeditious manner without having to attend to the manual releasing of the belt assemblies

50, 80; and, benefiting from timely exiting from a vehicle 105 afforded a user of the present invention 10.

The preferred embodiment of the system 10 may also be utilized in a deactivated or manual mode, thereby functioning in a similar manner as a conventional mechanical seat belt system by performing the following steps: selecting an "OFF" position upon the power switch 30; releasing the shoulder 50 and lap 80 belt assemblies by lifting the release plate portion 25 of the linear buckle 22. The automatic features of the system 10 are especially useful to law enforcement officers and/or military personnel who need to frequently and quickly exit a vehicle 105.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An automatic restraint belt release system comprising:
   a buckle assembly comprising:
   a control module configured to be affixed to a floor of a vehicle;
   a bracket attached to said control module with a first spring hinge;
   a belt buckle affixed to said bracket; and,
   a release mechanism integral with said belt buckle and in electrical communication with said control module;
   a shoulder belt assembly comprising a shoulder recoil unit;
   a lap belt assembly comprising a lap recoil unit;
   a latch switch adapted to be disposed within a door and in mechanical communication with a door latch mechanism of said vehicle and in electrical communication with said control module; and,
   a power switch adapted to be disposed on said door and in electrical communication with said control module;
   wherein said shoulder belt and said lap belt are removably attachable to said belt buckle;
   wherein said power switch activates said control module when activated by a user;
   wherein said latch switch activates said control module when said door is opened;
   wherein said control module activates said release mechanism; and,
   wherein said release mechanism disengages said shoulder belt and said lap belt from said belt buckle when activated.

2. The apparatus of claim 1, wherein said belt buckle comprises a linear buckle.

3. The apparatus of claim 1, wherein said control module comprises an enclosure rigidly mounted to said floor housing a control means for operating said releasing mechanism in electrical communication with both said latch switch and said power switch;
   wherein said bracket is hingedly attached to an upper surface of said enclosure and pivots with respect to enclosure;
   wherein said bracket permits routing of electrical cords between said control means and said release mechanism; and,
   wherein said control means actuates said release mechanism upon receipt of a signal from either said latch switch when said power switch is activated.

4. The apparatus of claim 1, wherein said shoulder recoil unit is configured to mounted to said door frame of said vehicle and said lap recoil unit is configured to be mounted to said floor of said vehicle.

5. The apparatus of claim 4, wherein:
   said shoulder belt assembly further comprises:
   a length of shoulder belting, having a distal end affixed to said shoulder recoil unit;
   a shoulder clasp affixed to a proximal end of said shoulder belting;
   a shoulder belt bracket having a first end;
   a shoulder roller unit comprising an integral portion of a second end of said shoulder belt bracket,
   a shoulder mounting bracket configured to be attached to said vehicle and attached to said shoulder belt bracket first end via a shoulder spring hinge; and,
   a shoulder stop bar slidably attached to said shoulder belting; and,
   said lap belt assembly further comprises:
   a length of lap belting, having a distal end affixed to said lap recoil unit;
   a lap clasp affixed to a proximal end of said lap belting;
   a lap belt bracket having a first end;
   a lap roller unit comprising an integral portion of a second end of said lap belt bracket,
   a lap mounting bracket configured to be attached to said vehicle and attached to said lap belt bracket first end via a lap spring hinge; and,
   a lap stop bar slidably attached to said lap belting;
   wherein said shoulder clasp and said lap clasp are removably attached to said release mechanism of said belt buckle;
   wherein said shoulder belting is routed through said shoulder roller unit of said shoulder belt bracket and said lap belting is routed through said lap roller unit of said lap belt bracket;
   wherein said shoulder recoil unit biases said shoulder belting to be wound thereon and said lap recoil unit biases said lap belting to be wound thereon; and,
   wherein said shoulder stop bar limits retraction of said shoulder belting via said shoulder recoil unit and said lap stop bar limits retraction of said lap belting via said lap recoil unit.

6. The apparatus of claim 5, wherein said belt bracket of said shoulder belt assembly and said lap belt assembly are each attached to said door frame of said vehicle.

7. The apparatus of claim 5, wherein said release mechanism further comprises:
   a release button supported by a first spring within said belt buckle, said release button extending outward from said belt buckle;
   a release solenoid in electrical communication with said control means;
   a belt latch operably coupled to said release solenoid via connecting linkage and supported by a second spring within said belt buckle; and,
   a linkage support mounted within said belt buckle such that said connecting linkage is pivotally connected thereto;
   wherein said second spring biases said belt latch to engage a clasp aperture within each said shoulder clasp and said lap clasp;

wherein said release button provides a manual release for said shoulder clasp and said lap clasp from said belt buckle by engaging said belt latch against said second spring; and, wherein said control means actuates said solenoid to operably motion said belt latch against said second spring to release said shoulder clasp and said lap clasp.

8. The apparatus of claim 7, wherein said release solenoid further comprises a linear electromagnetic unit having a reciprocating solenoid shaft portion.

9. An automatic restraint belt release system comprising:
a buckle assembly comprising:
  a control module configured to be affixed to a floor of a vehicle;
  a bracket attached to said control module with a first spring hinge;
  a belt buckle affixed to said bracket; and,
  a release mechanism integral with said belt buckle and in electrical communication with said control module;
a shoulder belt assembly comprising a shoulder recoil unit;
a lap belt assembly comprising a lap recoil unit;
a latch switch adapted to be disposed within a door and in mechanical communication with a door latch mechanism of said vehicle and in electrical communication with said control module; and,
a power switch adapted to be disposed on said door and in electrical communication with said control module;
wherein said shoulder belt and said lap belt are removably attachable to each other to enable simultaneous removable insertion within said belt buckle;
wherein said power switch activates said control module when activated by a user;
wherein said latch switch activates said control module when said door is opened;
wherein said control module activates said release mechanism; and,
wherein said release mechanism disengages said shoulder belt and said lap belt from said belt buckle when activated.

10. The apparatus of claim 9, wherein said belt buckle comprises a linear buckle.

11. The apparatus of claim 9, wherein said control module comprises an enclosure rigidly mounted to said floor housing a control means for operating said releasing mechanism in electrical communication with both said latch switch and said power switch;
  wherein said bracket is hingedly attached to an upper surface of said enclosure and pivots with respect to enclosure;
  wherein said bracket permits routing of electrical cords between said control means and said release mechanism; and,
  wherein said control means actuates said release mechanism upon receipt of a signal from either said latch switch when said power switch is activated.

12. The apparatus of claim 9, wherein said shoulder recoil unit is configured to mounted to said door frame of said vehicle and said lap recoil unit is configured to be mounted to said floor of said vehicle.

13. The apparatus of claim 12, wherein:
said shoulder belt assembly further comprises:
  a length of shoulder belting, having a distal end affixed to said shoulder recoil unit;
  a shoulder clasp affixed to a proximal end of said shoulder belting;
  a shoulder belt bracket having a first end;
  a shoulder roller unit comprising an integral portion of a second end of said shoulder belt bracket,
  a shoulder mounting bracket configured to be attached to said vehicle and attached to said shoulder belt bracket first end via a shoulder spring hinge; and,
  a shoulder stop bar slidably attached to said shoulder belting; and,
said lap belt assembly further comprises:
  a length of lap belting, having a distal end affixed to said lap recoil unit;
  a lap clasp affixed to a proximal end of said lap belting;
  a lap belt bracket having a first end;
  a lap roller unit comprising an integral portion of a second end of said lap belt bracket,
  a lap mounting bracket configured to be attached to said vehicle and attached to said lap belt bracket first end via a lap spring hinge; and,
  a lap stop bar slidably attached to said lap belting;
wherein said shoulder clasp and said lap clasp are removably attached to said release mechanism of said belt buckle;
wherein said shoulder belting is routed through said shoulder roller unit of said shoulder belt bracket and said lap belting is routed through said lap roller unit of said lap belt bracket;
wherein said shoulder recoil unit biases said shoulder belting to be wound thereon and said lap recoil unit biases said lap belting to be wound thereon; and,
wherein said shoulder stop bar limits retraction of said shoulder belting via said shoulder recoil unit and said lap stop bar limits retraction of said lap belting via said lap recoil unit.

14. The apparatus of claim 13, wherein said shoulder clasp further comprises a recessed alignment slot removably connected to an alignment tab of said lap clasp to enable alignment of said shoulder clasp and said lap clasp.

15. The apparatus of claim 14, wherein said belt bracket of said shoulder belt assembly and said lap belt assembly are each attached to said door frame of said vehicle.

16. The apparatus of claim 14, wherein said release mechanism further comprises:
  a release button supported by a first spring within said belt buckle, said release button extending outward from said belt buckle;
  a release solenoid in electrical communication with said control means;
  a belt latch operably coupled to said release solenoid via connecting linkage and supported by a second spring within said belt buckle; and,
  a linkage support mounted within said belt buckle such that said connecting linkage is pivotally connected thereto;
wherein said second spring biases said belt latch to engage a clasp aperture within each said shoulder clasp and said lap clasp;
wherein said release button provides a manual release for said shoulder clasp and said lap clasp from said belt buckle by engaging said belt latch against said second spring; and,
wherein said control means actuates said solenoid to operably motion said belt latch against said second spring to release said shoulder clasp and said lap clasp.

17. The apparatus of claim 16, wherein said release solenoid further comprises a linear electromagnetic unit having a reciprocating solenoid shaft portion.

18. A method of disengaging a seat belt, said method comprising the steps of: providing an automatic restraint belt release system comprising a buckle assembly further comprising a control module having a control means therein, said control module affixed to a vehicle, a release bracket hingedly affixed to said control module, a belt buckle affixed to said release bracket further having a release mechanism therein further comprising a release button supported by a first spring within said belt buckle, a release solenoid in electrical communication with said control means, a belt latch operably coupled to said release solenoid via connecting linkage and supported by a second spring within said belt buckle, and a linkage support mounted within said belt buckle such that said connecting linkage is pivotally connected thereto, a shoulder belt assembly further comprising shoulder belting having a distal end affixed to a shoulder recoil unit, a shoulder clasp affixed to a proximal end of said shoulder belting, a shoulder belt bracket having a first end, a shoulder roller unit comprising an integral portion of a second end of said shoulder belt bracket, a shoulder mounting bracket configured to be attached to said vehicle and attached to said shoulder belt bracket first end via a shoulder spring hinge, and a shoulder stop bar slidably attached to said shoulder belting, a lap belt assembly further comprising lap belting having a distal end affixed to a lap recoil unit, a lap clasp affixed to a proximal end of said lap belting, a lap belt bracket having a first end, a lap roller unit comprising an integral portion of a second end of said lap belt bracket, a lap mounting bracket configured to be attached to said vehicle and attached to said lap belt bracket first end via a lap spring hinge, and a lap stop bar slidably attached to said lap belting;

mounting a power switch within said vehicle and electrically connecting said power switch to said control means;

mounting a latch switch within a door of said vehicle such that said latch switch is in mechanical communication with a door latch mechanism and electrically connecting said latch switch to said control means;

connecting an alignment tab of shoulder clasp to an alignment slot of said lap clasp;

connecting said shoulder clasp and said lap clasp to said belt buckle, such that said release mechanism secures said belt latch to clasp apertures of said shoulder clasp and said lap clasp; and,     activating said release mechanism to release said shoulder clasp and said lap clasp.

19. The method of claim 18, wherein a manual release of said release mechanism further comprises the steps of:

switching said power switch to an off position; and, depressing said release button to motion said belt latch away from said clasp apertures of said shoulder clasp and said lap clasp.

20. The method of claim 18, wherein an automatic release of said release mechanism further comprises the steps of:

switching said power switch to an on position;

upon actuation of said door latch mechanism, sending a signal from said latch switch to said control means; and,     releasing said belt latch away from said clasp apertures of said shoulder clasp and said lap clasp upon receipt of said signal, wherein said control means activates said release solenoid to motion said belt latch via said connecting linkage.

\* \* \* \* \*